United States Patent [19]

Kasprzak

[11] 4,058,840
[45] Nov. 15, 1977

[54] METHOD AND APPARATUS FOR RECORDING A SINGLE VIDEO FRAME

[75] Inventor: Vincent D. Kasprzak, Mountain View, Calif.

[73] Assignee: Arvin Industries, Inc., Columbus, Ind.

[21] Appl. No.: 776,996

[22] Filed: Mar. 14, 1977

Related U.S. Application Data

[63] Continuation-in-part of Ser. No. 635,671, Nov. 26, 1975, abandoned.

[51] Int. Cl.$^2$ .......................................... H04N 5/795
[52] U.S. Cl. ........................................ 360/10; 360/11; 360/35
[58] Field of Search .................... 360/9, 10, 11, 35; 358/128

[56] References Cited

U.S. PATENT DOCUMENTS

| | | | |
|---|---|---|---|
| 3,395,248 | 7/1968 | Suzuki et al. | 360/10 |
| 3,454,713 | 7/1969 | Yanagimachi et al. | 360/10 |
| 3,501,584 | 3/1970 | Machein et al. | 360/10 |
| 3,518,366 | 6/1970 | Phan | 360/10 |
| 3,636,253 | 1/1972 | Notani et al. | 360/10 |
| 3,683,992 | 8/1972 | Fary | 360/10 |
| 3,909,512 | 9/1975 | Omori et al. | 360/10 |
| 3,919,716 | 11/1975 | Yumde et al. | 360/35 |
| 3,999,218 | 12/1976 | Iyama et al. | 360/10 |
| 4,015,289 | 3/1977 | Kinjo et al. | 360/11 |

Primary Examiner—Raymond F. Cardillo, Jr.
Attorney, Agent, or Firm—Biebel, French & Nauman

[57] ABSTRACT

A disc recorder having a single magnetic pick-up and record head and having a magnetic disc, rotating at the frame rate of a video signal, records and provides for display of a single frame from a video signal consisting of a series of video frames. Motion jitter is eliminated by recording on the disc recorder one of the two fields which make up a chosen video frame and then reproducing this field. The reproduced field signal is then stored and rerecorded onto the magnetic disc at a position relative to the original field recording corresponding to the delay between two interlaced fields. A memory having less capacity than that required for storing a complete field signal is used with only a portion of a field being reproduced, stored and rerecorded during each rotation of the magnetic disc. A complete video frame is thus recorded, ready for display, in which the two interlaced fields are identical.

6 Claims, 8 Drawing Figures

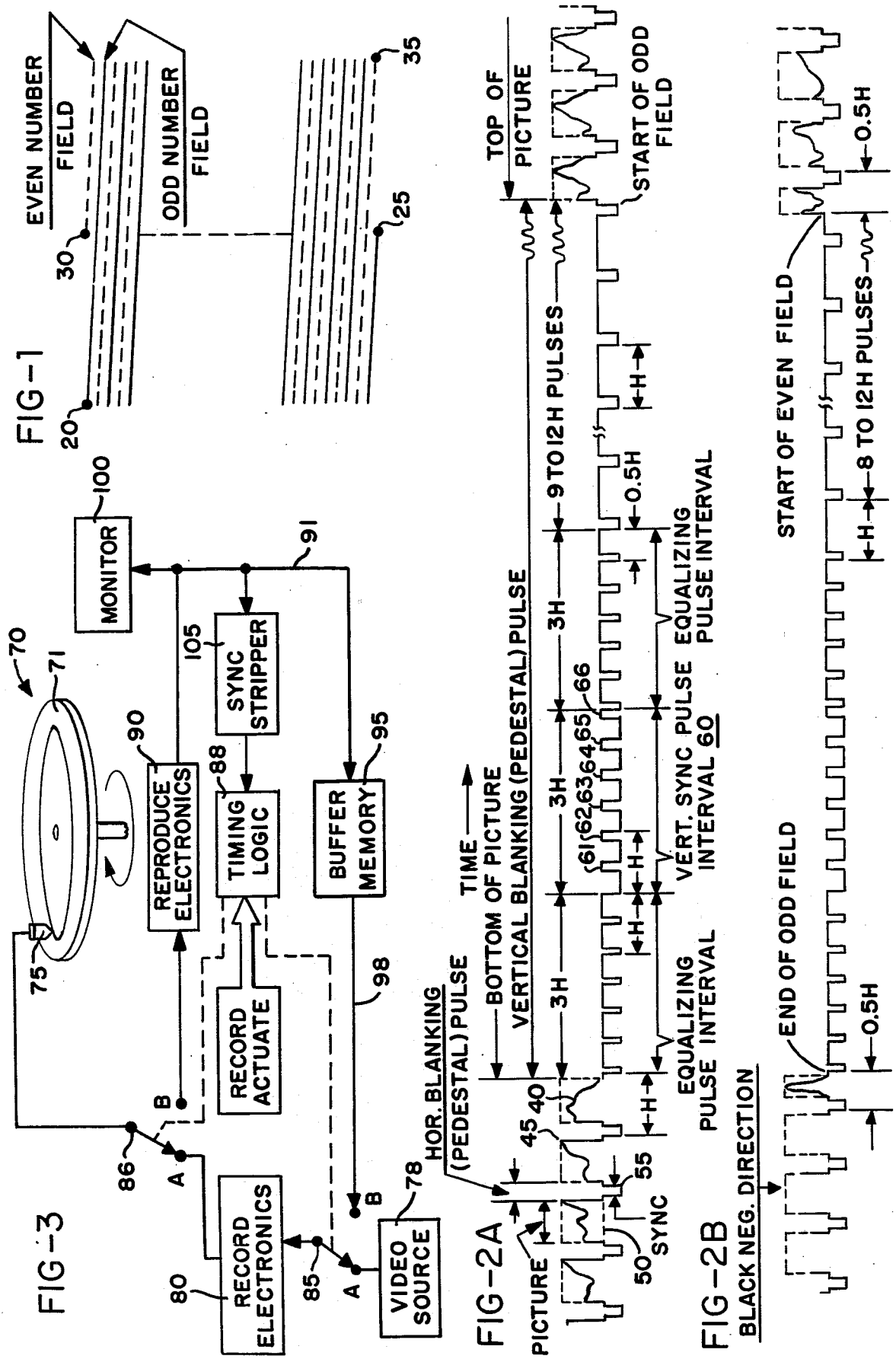

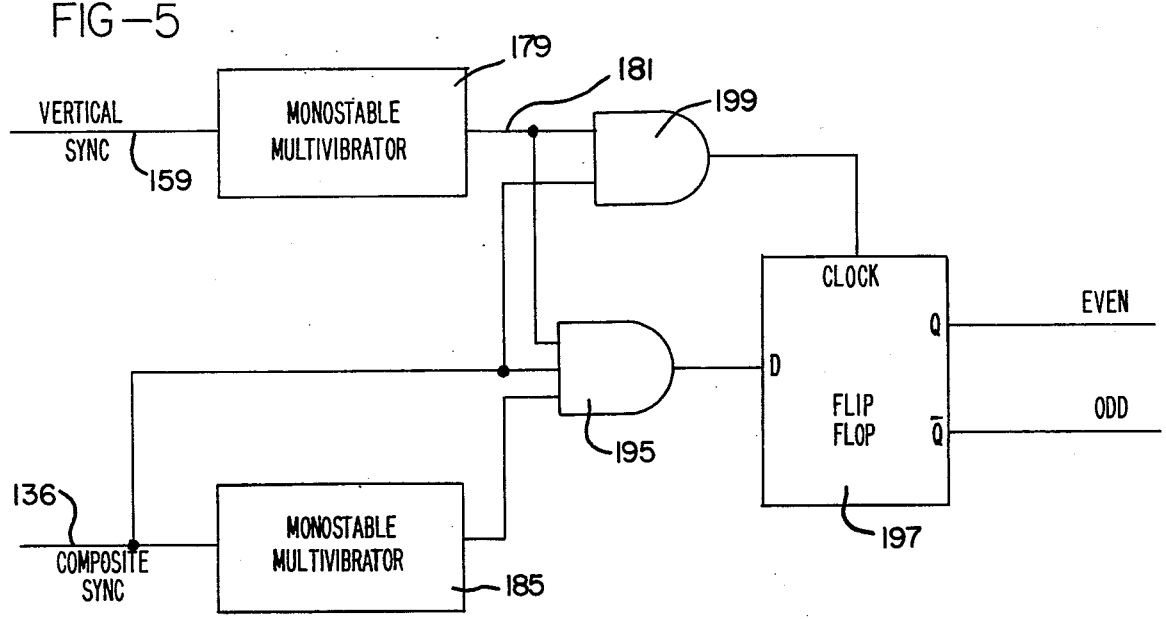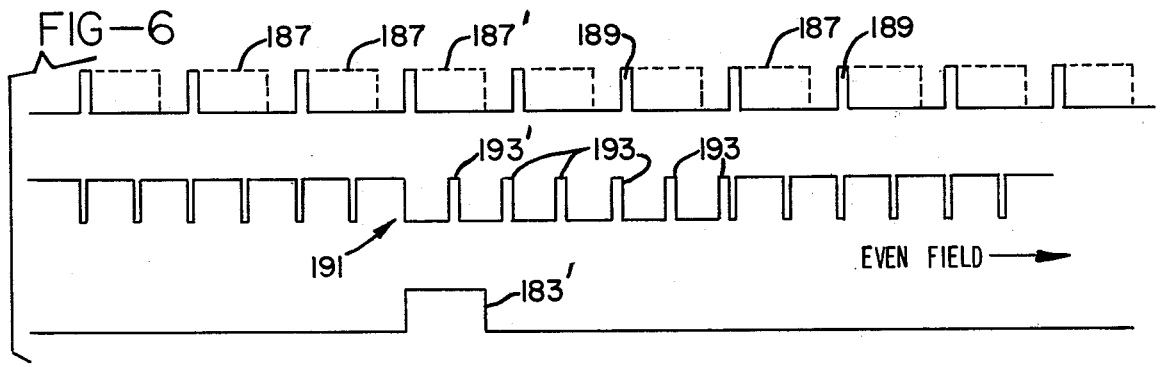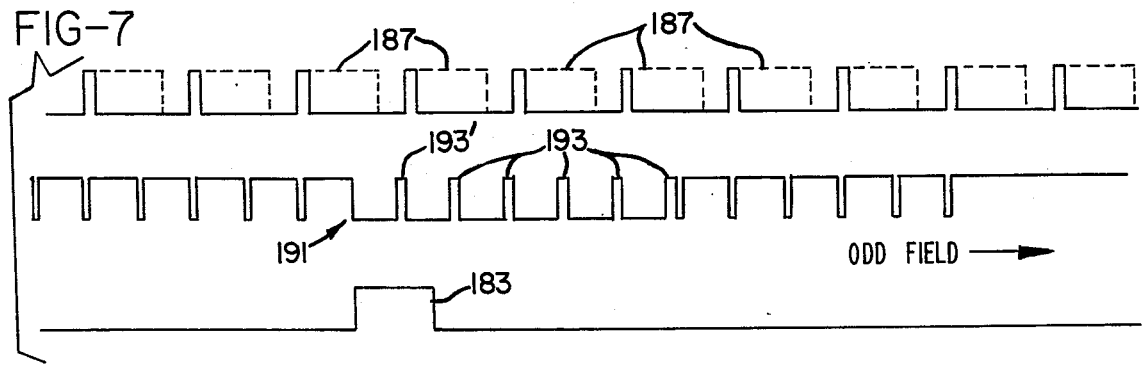

METHOD AND APPARATUS FOR RECORDING A SINGLE VIDEO FRAME

CROSS-REFERENCE TO RELATED APPLICATION

This application is a continuation-in-part of U.S. Pat. application Ser. No. 635,671, filed Nov. 26, 1975, now abandoned.

BACKGROUND OF THE INVENTION

This invention relates to magnetic recorders and recording methods and especially to such recorders adapted to be used to record and reproduce individual video frames for stop-action or slow motion video display. The standard for video signals currently used in the United States requires that a scanning pattern of 525 horizontal scanning lines per frame be utilized. A complete frame consists of two interlaced fields, the first field including the even numbered lines and the second field including the odd numbered lines in the picture scan. All of the lines in the first field are scanned in succession before the lines in the second field are scanned.

Magnetic disc recorders have in the past been used to produce high resolution images of single video frames. An individual frame may be reproduced repeatedly and supplied to a monitor so that a stop-action effect is created. Successive video frames each may be supplied to a video monitor a number of times to create a slow motion effect. If the subject portrayed in the video frame is in rapid motion, however, the first and second fields may differ significantly and interlaced display of these fields may therefore cause significant distortion. An effect known as motion jitter may occur due to the spatial displacement of the subject during the elapsed time between the two interlaced fields.

One approach to this problem has been to record only one field and to display this field repeatedly at the field rate. A frame thus would consist of only one field which is displayed twice in interlaced fashion. As shown in U.S. Pat. No. 3,636,253 to Notani et al., issued Jan. 18, 1972, this may be accomplished by using a field recorder in which one field is recorded during one full rotation of the magnetic disc. A frame is developed by reproducing the field signal twice and by displacing the second reproduced field by one-half horizontal line scan time from the first reproduced field to create the proper conditions for interlace. Since the first and second fields are identical, however, vertical resolution is needlessly sacrificed in displaying still subjects or subjects which are moving relatively slowly.

To allow for high vertical resolution in the case of still subjects and jitter-free operation in the case of rapidly moving subjects, two methods have previously been utilized. The first method is to require the disc recorder to operate at two rotational speeds. If a rapidly moving subject is to be displayed, the recorder is operated at the field rate with one field repeatedly displayed in interlaced fashion. If a still or slowly moving subject is displayed, however, the disc recorder is operated at the frame rate with both fields of a frame being recorded and displayed. This method of operation is difficult to achieve and relatively expensive. The disc drive servo-mechanism for two speed operation is complicated and sophisticated controls are required. Further, differences in dynamic performance of the recorder at the two speeds must be considered, both in the case of flying head hard disc recorders and in the case of flexible disc recorders.

A second method shown in U.S. Pat. No. 3,518,366 to Phan, issued June 30, 1972, involves rerecording one field of a frame twice on a frame recorder. To accomplish this, a frame recorder is modified by providing a second recording head precisely displaced from the first head. The two magnetic heads then record the single field simultaneously and one head is used for playback of the frame. If the disc is a multi-track disc, an additional stepper mechanism is required for the extra head. This method may also be costly and complicated and may cause excessive disc wear.

SUMMARY OF THE INVENTION

In accordance with the present invention, a method and apparatus for recording and displaying one frame in a video signal comprised of a succession of frames, in which each frame includes two interlaced fields, are provided in which motion jitter is eliminated. A single frame signal is recorded by a disc recorder rotating at the frame rate. Portions of a field of the recorded frame signal are reproduced and stored in a memory means. The stored signal is rerecorded by the disc recorder at a location on the disc in relation to the originally recorded field signal corresponding to the time delay between the initiation of two successive fields. Only a portion of the single field signal is reproduced, stored and rerecorded during each rotation of the disc recorder, and therefore a plurality of rotations are required to completely rerecord the single field signal. The two field signals recorded on the disc recorder are reproduced and supplied to a monitor such that a video frame consisting of two identical interlaced fields is displayed.

It is therefore an object of the invention to provide a method of recording and a disc recorder in which a single field signal may be recorded twice to constitute the two interlaced fields of a frame; to provide such a recorder in which only one recording head is necessary; further, to provide such a recorder in which operation of the recorder is at the frame rate of the video signal; to provide such a recorder in which a single field signal, having been recorded, is thereafter stored and rerecorded by the disc recorder to constitute the second interlaced field; and to provide such a recorder in which only a portion of the recorded single field signal is stored and rerecorded on each rotation of the disc recorder, and in which complete rerecording of the single field signal requires a plurality of rotations of the disc recorder.

Other objects and advantages of the invention will be apparent from the following description, the accompanying drawings and the appended claims.

BRIEF DESCRIPTION OF THE DRAWINGS

FIG. 1 is a representation of the standard interlaced video scanning pattern;

FIGS. 2A and 2B are representations of portions of a video signal;

FIG. 3 is a simplified diagrammatic representation of the preferred embodiment of the invention;

FIG. 5 is a schematic representation of the circuit for the odd/even field descriminator of FIG. 4; and FIGS. 6 and 7 are timing diagrams useful in explaining the operation of the device shown in FIG. 5.

DESCRIPTION OF THE PREFERRED EMBODIMENT

Figure 4:
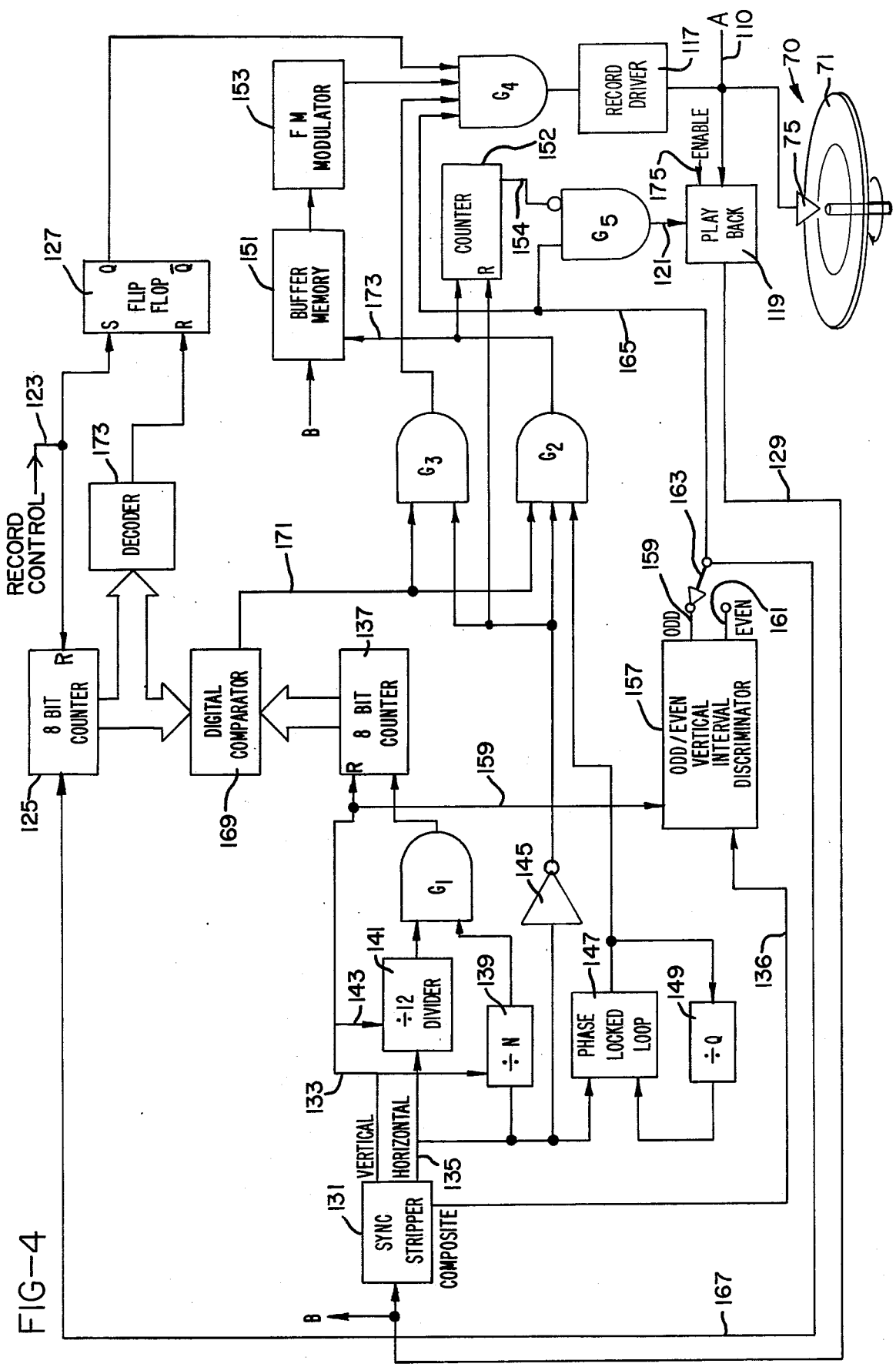
FIG. 4 is a schematic representation of the circuit arrangement of the present invention.

Referring now to FIG. 1, there is shown in diagrammatic form the standard interlaced scanning pattern utilized for video signals in the United States. The video signal consists of a succession of video pictures or frames which are presented at the rate of 30 per second. Each frame is made up of a number of horizontal scan lines with the United States standard being 525 lines per frame. As shown in FIG. 1, each horizontal line is slightly inclined to the right. This occurs because during the scanning process a vertical deflection signal is generated which moves the scanning beam from the top of the picture to the bottom of the picture at a constant rate. The horizontal deflection is much more rapid and acts to move the scanning beam from left to right to scan a line and then very rapidly to return the beam to the left edge of the picture to begin the scan of the next succeeding line in the field.

As seen in FIG. 1, each frame consists of two fields. Each odd numbered field begins at point 20 and ends at point 25. After an odd numbered field is scanned, the scanning beam is returned by a vertical deflection signal to point 30 where an even numbered field scan is begun. The even numbered field scan ends at point 35 and the scanning beam is then returned to point 20 for the initiation of the scan of the next odd numbered field.

Referring now to FIGS. 2A and 2B, two portions of a standard video signal are shown. FIG. 2A illustrates the end of an even field, the beginning of an odd field, and the vertical blanking between the fields. FIG. 2B is similar to FIG. 2A except that the end of an odd field and the beginning of an even field are shown. As seen in FIG. 2A, the scanning beam intensity for each line is provided by a wave form such as that indicated at 40. A level 45 is reached by the signal when a white portion of the line is scanned and a level 50 is reached by the signal when a black portion of the line is scanned. Timing information is provided on the video signal by a series of pulses, the amplitudes of which are not within the range used to specify the intensity of the beam.

Specifically, horizontal sync pulses, such as pulse 55, are provided to synchronize the horizontal beam deflection circuit in the video monitor with the video information supplied to the video monitor. Each of these pulses is outside the limits of the video beam intensity signal and, therefore, the picture displayed by the monitor is unaffected.

Between each field is a vertical sync pulse, shown at 60. The vertical sync pulse is serrated at 61, 62, 63, 64, 65 and 66 so that the horizontal deflection circuit is provided with information allowing it to remain synchronized with the incoming video signal. During the time period between fields, the scanning beam is returned to the top of the picture in preparation for scanning the next field. The vertical sync pulses are repeated at the field frequency of 60 per second and like the horizontal sync pulses, are of an amplitude which will leave the picture unaffected. Before and after the vertical sync pulse 60, six equalization pulses are provided in the equalization pulse intervals. The equalization pulses and serration pulses 61–66 appear at twice the horizontal line rate.

A comparison of FIGS. 2A and 2B indicates that differences exist in signal timing between even and odd fields. Specifically, when compared with the timing of each vertical sync pulse, the horizontal sync pulses used during an odd field are out of phase with the horizontal pulses used during an even field by an amount equal to one-half of a line scan. Since the initial line scan of an even numbered field is only one-half of a line and since, as seen in FIG. 1, the even and odd fields start at the same vertical position, this half line phase difference will cause each of the even field lines to be positioned exactly midway between two adjacent odd field scan lines.

Referring now to FIG. 3, there is shown the preferred embodiment of the invention. Disc recording means 70 includes a magnetic disc 71 and a magnetic pick-up and record head 75. Record head 75 may be positioned by a device such as that disclosed in U.S. Pat. No. 3,814,441, issued June 4, 1974, to Craggs. The recording disc may be mounted as shown in U.S. Pat. No. 3,840,897, issued Oct. 8, 1974, to Kelley et al. or U.S. Pat. No. 3,737,880, issued June 5, 1973, to Kelley. Magnetic disc 71 is rotated with respect to pick-up head 75 by a means for rotating the magnetic disc at the frame rate of 30 rps. Such means may include the disc drive devices disclosed in U.S. Pat. No. 3,814,844, issued June 4, 1974, to Waldspurger et al. and U.S. Pat. No. 3,883,090, issued May 13, 1975, to Hall. A source of video signal 78 supplies a video signal, consisting of a successive of video frames, to record electronics 80 which are of standard design. Switches 85 and 86 comprise a switching means which is initially set with both switches in their A positions. Although illustrated for the sake of simplicity as mechanical switches, switches 85 and 86 will be implemented by means of simiconductor switching arrangements or equivalent high speed switching devices.

When the preferred embodiment of the present invention is operating, a frame comprised of two interlocked fields, will be recorded on disc 71. When it is desired to record and display a single frame, comprised of two identical fields, from the video signal, the timing logic 88 is actuated and causes switches 85 and 86 to switch into their respective B positions. One of the two interlocked fields recorded on disc 71 is then reproduced by pick-up head 75 and standard reproduce electronics 90. The reproduced field signal is supplied via line 91 to a delay or buffer memory means 95 which stores a portion of the signal. Memory 95 may be in the form of a charge transport device such as a charge coupled device, a bucket brigade, charge injection device, or a MOS diode array. Alternatively, the memory may be digital with an analog-to-digital converter at the input and a digital-to-analog converter at the output.

After a portion of the field has been stored in the buffer memory 95, switch 86 is returned to its A position and the stored field information is then reapplied to record electronics 80 via line 98. The stored portion of the field is applied through switch 86 to the record head 75 and recorded by disc recorder 70. A portion of the field signal is then rerecorded during each of a plurality of successive rotations of the disc recorder until the entire field signal has been rerecorded. The timing of this rerecording is such that the rerecorded field is recorded directly over the second of the two interlaced fields previously recorded. The recording in FM erases the previously recorded signals. Thus the same field signal will be recorded on disc 71 as both the first and the second field of a frame. Switch 86 may then be switched into its B position and the recorded frame supplied to monitor 100 where the frame may be displayed. Since the first and second fields of the frame are identical, no motion jitter will occur.

The storage capacity of the memory determines the speed of the rerecording operation. If the memory has a capacity of N lines, N lines may be rerecorded during each rotation of the disc. Since there are, at most, 245 active video lines per field, the number of disc rotations required to rerecord a field would be 245 divided by N (rounded off to the next larger interger).

As mentioned previously, rerecording of the single field signal takes place directly over a previously recorded field signal to time precisely the rerecording process. The timing logic 88 and sync stripper 105 may monitor the horizontal sync of the field to be replaced. Further these sync signals of the original video signal may be left unmodified on disc 71 with only the active line signal of the field to be rerecorded being stored in memory. The logic will thus cause the stored lines to be rerecorded onto the disc, replacing one for one the lines complementary to this field.

The choice of fields for rerecording may be made on either a first-come-first-serve basis or may be previously determined. The timing logic may rerecord only even or odd numbered fields into complementary positions. Operating in a mode where the field to be rerecorded is selected arbitrarily may require that the playback rerecord sequence be controlled by one of two separate control circuits after it is determined whether an even numbered field or an odd numbered field is to be rerecorded. As previously mentioned, there is a one-half horizontal line displacement between odd and even fields and this may serve as a method of detecting which of the two fields has been chosen for rerecording.

If it is desired to increase the speed of operation, the storage capacity of buffer memory 95 may be increased so that an entire field signal is stored simultaneously. Such change would of course materially increase the cost of the recording apparatus. With such a memory, however, the apparatus of FIG. 3 could also function as a field recorder having an expanded capacity. This would be accomplished by only recording alternate fields on recording disc 71. Since rotation is at the frame rate, two non-related fields would be stored on each circular track on the disc. When one of the recorded fields is to be viewed on monitor 100, transducer 75 is moved to the appropriate track and switch 86 is switched into its B position. The desired field signal is then supplied to monitor 100 via reproduce electronics 90. This same field signal is simultaneously fed via line 91 to buffer memory 95. The output of buffer memory 95 may then be applied by a switching arrangement (not shown) to monitor 100. The second application of the field signal is timed so as to create the necessary conditions for interlace. Thus by storing only alternate fields on the disc recorder, twice as many frames would be available for reproduction with acceptable definition.

To prevent moire effects that may occur as one field is rerecorded over another field, the disc 71 may be rotated initially with one field being erased prior to initiating of the rerecording process. The erasure may extend into the horizontal sync pulses so that the switching transients which occur as the FM modulator is turned on and off will be removed during sync processing. The sync must not be completely erased.

Reference is now made to FIG. 4 in which a schematic representation of the circuit of the preferred embodiment of the invention is shown. The disc recorder 70 includes a single transducer head 75 which cooperates to record on magnetic disc 71 in the manner previously discussed. Transducer head 75 is used for recording and playback on the disc. An FM modulated video signal to be recorded is supplied to input A on line 110 which provides an input for standard record driver electronics 117. The signal on line 110 will be continuously recorded on the disc 71 by transducer head 75. Playback circuit 119 controls the playback of the video signals which have been recorded on disc 71. Playback circuit includes an FM demodulator and amplifiers and is gated off by a signal on line 121.

When it is desired to rerecord a video field on the disc 71 to produce a video frame having identical fields, the signal on input A is removed and a record pulse applied by appropriate circuitry to line 123. This resets counter 125 and sets flip-flop 127, enabling circuit operation in a manner to be described below. The playback circuit 119 will also be enabled such that the frame which has been recorded will be played back by electronics 119 and supplied to line 129.

Sync stripper 131 separates the vertical, horizontal and composite sync signals from the video signals and applies them to lines 133, 135, 136, respectively. The vertical sync pulses on lines 133 will reset counter 137, divide-by-N counter 139, and divide-by-12-divider 141. The horizontal sync pulses on line 135 are supplied to gate $G_1$ via divide-by-N counter 139 and via divide-by-12 divider 141. The number N is set to equal the number of video lines which are to be rerecorded during each revolution of the recorder. Divider 141 supplies a high signal on its output after receiving 12 input pulses. The horizontal sync pulses are also supplied to inverter 145 which disables AND gates $G_2$ and $G_3$ upon receipt of each horizontal sync pulse.

Phase locked loop oscillator 147 with feedback divider 149 provides a pulse train at the rate of Q times the horizontal sync frequency to gate $G_2$. Gate $G_2$, when enabled, supplies this high frequency output to a buffer memory 151 and counter 152. Buffer memory 151 may be a charge transport memory or, alternatively, a digital memory with an analog-to-digital converter at its input and a digital-to-analog converter at its output. The pulse train output from gate $G_2$ controls the rate at which the video signal information is shifted through the buffer memory 151. A conventional FM modulator 153 receives the output from buffer memory 151 and supplies it to gate $G_4$. Counter 152 counts the pulse train and supplies an output signal on line 154 after Q pulses have been counted and the active portion of the video line reproduced. The output from inverter 145 resets counter 152 prior to each video line.

The sync stripper 131 provides a composite sync signal on line 136 which includes both the vertical and horizontal sync information as well as the equalization pulses and the serration pulses which occur during the vertical pulse interval. This composite signal is applied to odd/even vertical interval discriminator 157 which also receives the vertical sync signal on line 159.

Discriminator 157 provides output pulses on lines 159 and 161 which indicate when the odd and even fields of the recorded material are being reproduced. Output 159 will remain high for the duration of each odd field and go low for the duration of each even field. Similarly, output 161 will go high during each even field and low during each odd field. Switch 163 is provided to permit the operator to choose whether the odd field or the even field on the disc 71 is to be replaced with the opposite field information.

The output of the odd/even vertical interval discriminator 157 is supplied on line 165 to gates $G_4$ and $G_5$ and, on line 167, to the count input of binary counter 125. The parallel outputs of counters 125 and 137 are provided to digital comparator 169. When comparator 169 senses that the count in the two counters is equal, it provides an output signal on line 171. The count in counter 125, additionally, is sensed by decoder 173 which provides a reset pulse to flip-flop 127 when counter 125 reaches a count state equalling 242 divided by N.

The operation of the circuit of FIG. 4 is as follows. Initially, when an operator determines that a frame is to be recorded, a single frame signal will be applied to input A and, via line 110, to the disc recorder 70. Since playback circuit 119 will not at this time be enabled, it will provide no signal to line 129. The disc recorder 70 will now have recorded on a single track a frame signal consisting of two interlaced field signals. If the operator should determine that it is desirable to compose a video frame consisting of two interlaced, identical fields, the operator will actuate appropriate circuitry which will apply a pulse to line 123, thus resetting counter 125, while setting flip-flop 127. The Q output of flip-flop 127 will then go high. Playback circuit 119 will also receive a signal on its enabling input 175. Such an enabling signal may conveniently be obtained from the Q output of flip-flop 127. A single video frame consisting of two interlaced fields of non-identical video information will have been recorded on the disc 71. Switch 163 will have been set to either the odd or even switch position, thus determining which of the two fields is to be replaced.

Assuming that an even field is then reproduced, the signal on line 165 will be low and playback circuit 119 will not be inhibited by AND gate $G_5$. Circuit 119 will reproduce video signal stored by the recorder and apply this signal to line 129. Playback circuit 119 includes the appropriate standard FM demodulator and amplifiers. The video signal which is played back will be applied by line 129 to sync stripper 131 and also to buffer memory 151. The line termination marked B at the input of sync stripper 131 is connected to the line marked B on the input of buffer memory 151. The buffer memory 151 will begin to store the video signal.

Sync stripper 131 will separate the vertical, horizontal, and composite sync pulses from the video signal and apply them to lines 133, 135, and 136, respectively. When the first vertical interval is reached, a vertical sync pulse will be applied to line 133. The trailing edge of the vertical sync pulse will reset counter 137, divide-by-N counter 139, and divide-by-12 counter 141. After the vertical blanking interval, the horizontal sync pulses applied to line 135 will be counted by divider 141 and counter 139. After divider 141 has counted 12 horizontal sync pulses, and the divide-by-N counter 139 has counted N horizontal sync pulses, gate $G_1$ will be enabled.

Counter 137 will have been initially reset to a zero count. Counter 125 will have also been reset but will have received a pulse on line 167 such that it will be at a "one" count. Only the first set of N active lines of video will be clocked into the buffer memory 151, therefore. When the 8 bit counter 137 receives a second pulse from $G_1$, line 171 from comparator 169 will be switched low and gates $G_2$ and $G_3$ disabled. Thus only the active lines of video information will be stored in the buffer memory and the first twelve inactive lines ignored.

Assuming that the field from which these video horizontal lines were taken was an even field, gate $G_4$ will be enabled by the odd/even vertical interval descriminator 157 during the next vertical interval, just prior to the succeeding odd field. Counter 137 will be reset by the vertical sync signal to a zero count and thus digital comparator 169 will provide a high output signal which will enable AND gates $G_2$ and $G_3$ only after the recorder has reproduced the desired number of horizontal lines and the counts in counter 137 and 125 are again equal. Inverter 145 insures that only active portions of the video signal are stored in memory 15 and rerecorded onto the disc. The stored lines of video information will then be gated through gate $G_4$ and recorded onto the disc recorder. The high signal on line 165 will be transmitted to inhibit playback circuit 119 during the rerecording process except when inhibited by counter 152. Counter 152 will provide an output on line 154 after each active line of video information; the previously recorded sync signals will therefore be applied to the line 129. The counter 137 will thereafter increase its count by one, disabling comparator 171 and gates $G_3$ and $G_2$.

During the next revolution counter 125 will have been indexed such that its count is increased by one. Counters 137 and 125 will be equal in count twice during this revolution but during the next successive group of N horizontal video lines. Thus counter 125 will count the revolutions of the disc recorder and counter 137 and digital comparator 169 will insure that during each revolution a group of N horizontal lines is stored in the buffer memory 151 and then rerecorded onto the disc.

The decoder 173 is responsive to the count in counter 125 to provide a reset pulse to flip-flop 127 when counter 125 reaches a count equal to 242 (the number of active video lines) divided by N, rounded to the next larger integer. This will, by definition, occur after all the groups of N horizontal lines have been properly rerecorded onto the disc at the appropriate locations.

Referring now to FIG. 5, the odd/even vertical interval descriminator 157 is shown in greater detail. FIGS. 6 and 7 are pulse diagrams useful in explaining the manner in which this circuit operates. Vertical sync signals are applied to line 159 while the composite sync signals are applied to line 136. Monostable multivibrator 179 is triggered by the leading edge of the vertical sync pulse. The multivibrator is non-retriggerable provides a pulse on its output 181 which is equal in duration to 75% of the horizontal line period. The output of monostable multivibrator 179 is represented in FIGS. 6 and 7 as pulses 183.

Monostable multivibrator 185 receives the composite sync signal on line 136 and provides on its output a series of pulses in phase with the horizontal sync signal and at the horizontal sync frequency but having a duration of 75% of the horizontal line period. These pulses are represented in dashed lines in FIGS. 6 and 7 as pulses 187. The solid line pulses 189 illustrate the relative width of the horizontal sync pulses. The composite sync signals 191 are shown in FIGS. 6 and 7. It should be noticed that the vertical sync portion of the composite signal is broken by a plurality of serration pulses 193.

FIG. 6 indicates the relationship of the three pulse trains during the vertical interval just prior to an even field while FIG. 7 shows such a time relationship during the vertical interval just prior to an odd field. A careful comparison of the relationship among the pulse trains illustrated in FIGS. 6 and 7 will reveal that pulses 183', 193' and 187' in FIG. 6 will all be high simultaneously. In FIG. 7, however, pulse 193' will not be coincident with any of the pulses 187.

If the three pulse trains are applied to an AND gate, such as AND gate 195 in FIG. 5, the AND gate will supply pulse output at the beginning of each even field. The gate will, however, not provide such an output at the beginning of each odd field. The output of gate 195 is supplied to a flip-flop 197 which changes state in dependence upon the signal applied to its D input at the time it receives a clock input. AND gate 199 combines the vertical sync pulse 183 with the composite sync signal 191 such that it provides a high output at the first serration pulse of each vertical interval. If an even field is about to occur, AND gate 195 will also provide an output, thus causing flip-flop 197 to provide a high signal on its Q output. If, on the other hand, an odd field is about to occur, the flip-flop 197 will be clocked as AND gate 195 provides a low output. Flip-flop 197 will therefore provide a high output on its Q output. Thus flip-flop 197 will provide complementary pulse trains in phase with the alternation between fields by the video disc recorder.

While the method herein described, and the form of apparatus for carrying this method into effect, constitute preferred embodiments of the invention, it is to be understood that the invention is not limited to this precise method and form of apparatus, and that changes may be made in either without departing from the scope of the invention.

What is claimed is:

1. A method of developing a frame signal from a video signal comprised of a succession of frames, each frame including two interlaced fields, comprising the steps of:
    recording a single frame signal on a disc recorder, said disc recorder including a single transducer and a magnetic disc rotating at the rate of one rotation for each frame in said succession of frames,
    producing one field signal of the recorded frame signal with said transducer and storing said field signal,
    rerecording the stored single field signal on said disc recorder, and
    reproducing the two field signals recorded on said disc recorder whereby a frame signal consisting of two identical interlaced fields is provided.

2. The method of claim 1 further comprising the step of supplying said two field signals which were recorded on said disc recorder to a monitor whereby a frame consisting of two identical interlaced fields is displayed.

3. The method of claim 2 in which only a portion of said one field signal including an integral number of lines is reproduced, stored and rerecorded during each rotation of said magnetic disc whereby a plurality of rotations of said disc recorder are required prior to reproducing the two field signals and supplying said signals to a monitor.

4. A method of developing a single frame video signal from a video signal consisting of successive frames, each of said successive frames consisting of two interlaced fields, and recording said single frame video signal on a recorder having a moving magnetic medium and a single stationary transducer, said transducer defining an endless recording track on said medium during a complete cycle of movement of said magnetic medium, comprising the steps of:
    applying a single field signal to said transducer and recording said single field signal on said recording track,
    sensing the recorded single field signal with said transducer and supplying said single field signal to a memory,
    storing said single field signal in said memory,
    reading out said single field signal from said memory and reapplying said single field signal to said transducer, and
    rerecording said single field signal on said recording track at a position on said track corresponding to the time delay between two interlaced fields, whereby said single field signal is recorded twice on said recording track and positioned so that the two recordings of said single field signal are interlaced to comprise a single frame signal.

5. A method of developing a single frame video signal from a video signal consisting of successive frames, each of said successive frames consisting of two interlaced fields and each of said fields consisting of a plurality of lines, and recording said single frame video signal on a recorder having a moving magnetic medium and a single stationary transducer, said transducer defining an endless recording track on said medium as said medium moves past said transducer, comprising the steps of:
    a. applying a single field signal to said transducer and recording said single field signal on said recording track,
    b. sensing a portion of the recorded single field signal with said transducer, said portion including an integer number of said plurality of lines,
    c. storing the sensed portion of said single field signal,
    d. rerecording said sensed portion of said single field signal on said medium at a location on said recording track with respect to the portion of the sensed portion of said single field signal corresponding to the time delay between the initiation of two successive fields, and
    e. repeating steps (b), (c) and (d) for successive portions of said single field signal until said single field signal is rerecorded in its entirety on said recording track in a position such that said single field signal comprises the interlaced fields of a video frame signal.

6. A stop-action recorder for recording a video signal and for providing at a frame rate to a monitor a video frame composed of two interlaced fields, without the motion jitter that results from spatial displacement of a subject during the time between display of the two interlaced fields, comprising:
    video source means for providing a signal to be recorded;
    disc means, including a magnetic disc and a magnetic pick-up and record head adjacent said magnetic disc, for recording a video signal;
    means for rotating said disc at the rate of one revolution per frame;
    memory means for storing a signal applied thereto;
    switch means for applying one of said two interlaced field signals to said disc means to be recorded on said magnetic disc during one-half revolution of said disc;
    means, connected to said head, for reproducing said one of said two interlaced field signals recorded on said magnetic disc and for applying the reproduced field signal to said memory means; and
    means, connected to said memory means, for reapplying said reproduced field signal to said switch means whereby said one of said two interlaced fields is rerecorded by said disc means such that, in a subsequent display of the signal recorded on said disc means, a frame composed of two identical interlaced fields will be shown by a video monitor.

* * * * *

UNITED STATES PATENT AND TRADEMARK OFFICE
CERTIFICATE OF CORRECTION

PATENT NO. : 4,058,840
DATED : November 15, 1977
INVENTOR(S) : Vincent D. Kasprzak It is certified that error appears in the above-identified patent and that said Letters Patent are hereby corrected as shown below:

Col. 4, line 26 "successive" should read--succession

Col. 5, line 9 "interger" should read--integer

Col. 6, line 25 "divide-by-12-divider" should read--divide-by-12 divider

Col. 9, line 19 "Q" should read--$\bar{Q}$

Col. 9, line 39 "producing" should read--reproducing.

Signed and Sealed this

Eighth Day of August 1978

[SEAL]

Attest:

RUTH C. MASON
Attesting Officer

DONALD W. BANNER
Commissioner of Patents and Trademarks